Jan. 27, 1959
A. J. CLAYTON
2,870,936
CLOSED SYSTEM FOR VENTING AND INERTING
AIRCRAFT FUEL TANKS
Filed March 18, 1957
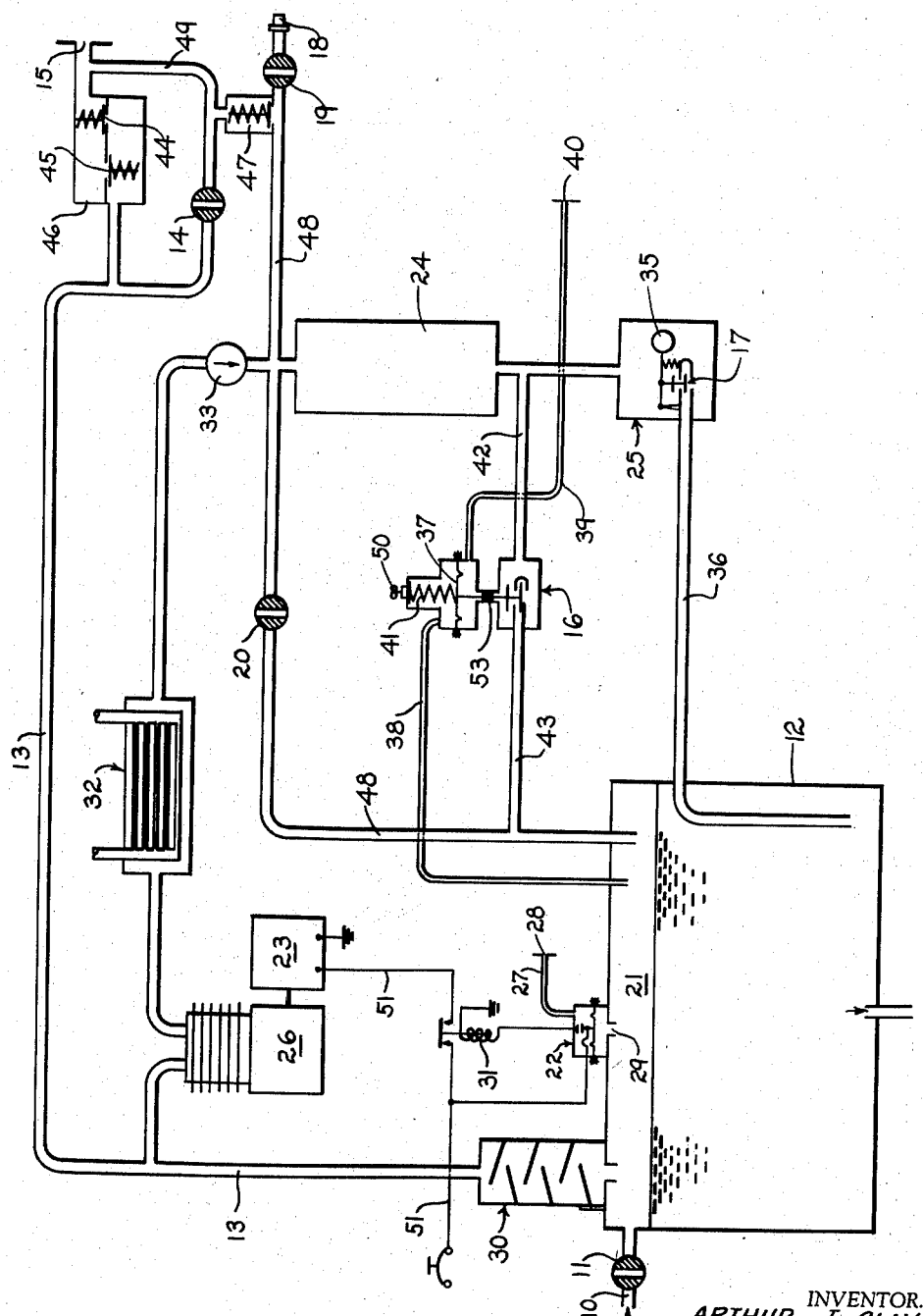
INVENTOR.
ARTHUR J. CLAYTON
BY *Hubert Miller*
ATTORNEY

United States Patent Office 2,870,936
Patented Jan. 27, 1959

2,870,936
CLOSED SYSTEM FOR VENTING AND INERTING AIRCRAFT FUEL TANKS

Arthur J. Clayton, Seattle, Wash., assignor to Boeing Airplane Company, Wichita, Kans., a corporation of Delaware Application March 18, 1957, Serial No. 646,705

10 Claims. (Cl. 220—88)

This invention relates to a system for automatically maintaining the vapor space above the highly volatile fuel in an airplane fuel tank at substantially the same pressure as the external atmospheric pressure surrounding the tank, regardless of airplane altitude changes or other changes affecting atmospheric pressure and for simultaneously maintaining the vapor-gas mixture in such space in a non-inflammable and non-explosive condition.

The primary disadvantages of presently used "open" vent systems are: (1) highly volatile fuel vapors are often released from the fuel tanks of an aircraft into a high temperature environment, thus creating a dangerous fire hazard; (2) considerable amounts of fuel as well as inerting gases are lost in vapor form; and (3) outside air introduced into the fuel tank vapor space dilutes and often renders the previously introduced inert gas ineffective, thus creating an inflammable gas mixture within the tank.

An important object of this invention is to provide a system which eliminates open communication between the vapor space in the tank and the atmosphere, thus eliminating escape of toxic fumes dangerous to aircraft personnel, and eliminating the formation of insoluble solids within the tank often caused by chemical action resulting from the presence of water vapor which enters the vapor space in the tank with atmospheric air.

Another object of the invention is to provide a system which constantly maintains the fuel in the tank in contact only with an inert and non-inflammable vapor-gas mixture by introducing inert gas into the tank vapor space, as required.

Still another object is to provide a system which maintains the vapor space in a fuel tank substantially at ambient pressure as the vapor space volume varies with fuel consumption, regardless of changes in external pressures and temperatures due to altitude changes or other causes.

Another object is to provide a system which operates substantially without the loss of fuel in the form of vapor and without the loss of the inert gas which is used to render the fuel vapors non-inflammable.

The invention, together with other objects, will be more clearly understood when the following description is read with reference to the accompanying drawing, which is a schematic view illustrating one complete embodiment of the invention.

Briefly, in combination with a conventional fuel tank or tanks 12, the illustrated system embodying the invention includes: (1) a pressure vessel or reservoir 24 for storing a selected inert gas under pressure; (2) a differential pressure actuated balanced valve 16 responsive to a relative increase in atmospheric pressure to permit inert gas to pass from the pressurized reservoir into the vapor chamber 21 above the fuel in the tank until the vapor chamber pressure is substantially equal to ambient atmospheric pressure; (3) a float actuated valve 17 in communication with gas reservoir 24 and with the tank, which periodically opens to permit accumulated fuel condensate to be forced by gas pressure from the reservoir sump into the fuel tank; (4) a power operated vapor pump 26 having its intake port in communication with the tank and its discharge port in communication with the gas reservoir 24; (5) a differential pressure operated transducer 22 operable to start the pump in response to a relative decrease in ambient atmospheric pressure to move gas from tank 12 into reservoir 24, and operable to stop the pump after vapor chamber has dropped a sufficient amount to equal ambient atmospheric pressure; and (6) adequate plumbing to conduct fuel vapors, inert gas, and fuel condensate to and from the enumerated components, as necessary.

Since all the components of the system, both major and minor, are of conventional construction and well known to those familiar with this art, it is believed unnecessary to describe in detail the construction and operation of each individual component. It should suffice to briefly describe the components and their respective functions in connection with an explanation of the operation of the complete system, as illustrated.

*Operation—Ground refueling.*—A fuel supply line (not shown) is connected to filler pipe 10, and valve 11 is opened to admit fuel to tank 12. Gas and vapor in the tank which is displaced by the incoming fuel is forced out through pipe 13, open valve 14, pipe 49, and through remotely located external vent 15. Normally closed valves 16 and 17 remain closed.

When tank 12 is filled to the desired level, an inert gas pressure supply line is connected to filler pipe 18, valves 11 and 14 are closed, and valves 19 and 20 are opened. Inert gas under pressure flows through pipe 48 into tank vapor space 21 and into the pipes communicating therewith until the pressure therein actuates preset pressure transducer 22 to operate relay 31 to close the electrical circuit 51 to operate pump driving motor 23. As soon as pump 26 begins to operate valve 20 is closed and a desired inert gas pressure is built up in pressure reservoir 24 and its communicating sump 25. Balanced valve 16 and float valve 17 remain closed. Packing 53 in valve 16 prevents reservoir gas pressure from affecting diaphragm 37.

The maximum permitted inert gas pressure is predetermined by relief valve 47. Valve 19 is then closed and the system is ready for automatic operation in flight.

It should be understood that if tank 12 is being refueled in flight, valves 14, 19 and 20 should be closed during the refueling operation. As tank 12 fills, pressure in chamber 21 increases and pressure transducer 22 will then actuate pump 26, and gases and vapors in chamber 21 will be withdrawn by the pump and stored in reservoir 24, thus preventing the pressure in vapor chamber 21, from exceeding ambient atmospheric pressure during the in-flight refueling operation.

*Flight operation—Ascent.*—With increase in altitude atmospheric pressure decreases. As the airplane gains altitude the diaphragm in transducer 22 is moved upward by the relatively higher pressure in vapor chamber 21, the diaphragm actuates relay 31 which in turn closes the electrical circuit 51 to motor 23, and pump 26 then evacuates a mixture of fuel vapor and inert gas from vapor chamber 21 until internal tank pressure drops to a value substantially equal to ambient atmospheric pressure, as sensed by the transducer diaphragm through pipe 27 and external vent 28, and through port 29.

Gas and fuel vapor evacuated from chamber 21 is drawn through baffled trap 30, which removes a major portion of liquid droplets, returning them to the tank by gravity. The gas-vapor mixture is then forced through heat exchanger 32 to remove the heat of compression, through check valve 33, and into reservoir 24. Thus the gas pressure in reservoir 24 is maintained and the excess gas is stored for subsequent use in the system.

After the pump 26 has reduced the pressure in chamber 21 to a value substantially equal to ambient atmospheric pressure, transducer 22 breaks the circuit to relay 31, and thus stops pump 26. Pump operation is repeated whenever ambient atmospheric pressure drops below vapor chamber pressure.

Condensate which may gradually accumulate in reservoir 24 collects in sump 25. When the liquid in sump 25 rises to a predetermined level, float 35 opens normally closed valve 17 and condensed fuel passes into tank 12 through pipe 36 under the influence of the gas pressure in reservoir 24.

*Flight operation—Descent.*—As altitude decreases atmospheric pressure increases. During descending flight the differential between atmospheric pressure and the pressure in chamber 21 is sensed by diaphragm 37 in balanced valve 16 through pipes 38 and 39, and through external atmospheric vent 40. Excess atmospheric pressure moves diaphragm 37 upward against the force of compression spring 41, and opens the valve 16. Inert gas, under higher pressure, is metered through valve 16 from reservoir 24 through pipes 42 and 43 into chamber 21 until the pressure therein substantially equals ambient atmospheric pressure at which time the diaphragm returns to its normal position and valve 16 is thereby closed. This cycle is repeated whenever a pressure differential arises.

*Safety features.*—In case of malfunction in the system the opposed spring seated check valves 44 and 45 in housing 46 relieve excessive over and under pressures, respectively, in chamber 21. Spring pressed relief valve 47, which is in open communication with reservoir 24 through pipe 48, relieves any excess pressure in the reservoir through pipe 49 and vent 15.

From the above it will be seen that this invention provides a closed fuel system which is particularly adapted for use in airplanes; which eliminates fire and explosion hazards normally present in atmospheric venting systems; which will eliminate the release of fuel vapor directly into the atmosphere; which eliminates fuel losses through evaporation; which prevents the entry of atmospheric air into the system; which very materially reduces the quantity of inert gas required during a given period of airplane operation; which maintains the internal fuel tank pressure equal to ambient atmospheric pressure at all times, thus preventing injury to the fuel tank; and which will do all these things automatically so long as the inert gas supply is replenished as required.

Having described the invention with sufficient clarity to enable those familiar with this art to construct and use it, I claim:

1. A closed system for simultaneously and continuously inerting and maintaining the vapor space or chamber in a fuel tank at a pressure substantially equivalent to ambient atmospheric pressure regardless of changes in such atmospheric pressure, comprising: a pressure reservoir for storing inert gas and fuel vapor at a pressure greater than external ambient atmospheric pressure; a first passageway connecting the reservoir with the fuel tank vapor chamber; flow blocking means interposed in said passageway responsive to an increase in external ambient atmospheric pressure to open communication between the reservoir and the vapor chamber, and responsive to the resulting equalization of external ambient atmospheric and internal vapor chamber pressures to again block communication between reservoir and vapor chamber; a second passageway connecting the reservoir with the vapor chamber; power driven vapor moving means interposed in the second passageway; and means responsive to a decrease in external ambient atmospheric pressure to render the vapor moving means operative to draw gas and vapor from the vapor chamber and to force it into said reservoir, and responsive to the resulting equalization of external ambient atmospheric and internal vapor chamber pressures to render the vapor moving means inoperative.

2. The system described in claim 1, and a third passageway connecting a low point in the reservoir with a low point in the fuel tank; liquid flow blocking means interposed in the third passage responsive to a predetermined accumulation of condensate in said reservoir to open communication through said third passageway, and responsive to evacuation of accumulated condensate in the reservoir to again close communication through the third passageway.

3. The system described in claim 1 in which the flow blocking means in the first passageway is a differential pressure actuated normally closed balanced valve.

4. The system described in claim 1 in which the vapor moving means is an electric motor driven vapor pump.

5. The system described in claim 4 in which the means for rendering the vapor pump operative and inoperative is a differential pressure operated device capable of opening and closing the electrical circuit to said motor, and operates to close the motor circuit when external ambient atmospheric pressure drops to a predetermined value lower than internal fuel tank vapor chamber pressure, and operates to open the motor circuit when the internal fuel tank vapor chamber pressure and the external ambient atmospheric pressure are substantially equalized.

6. The system described in claim 4 and a heat exchanger interposed in the second passageway between the pump and reservoir.

7. The system described in claim 4 and a liquid trap interposed in the second passageway between the fuel tank and the pump.

8. The system described in claim 1 and a pressure relief safety valve in open communication with the vapor chamber in said fuel tank.

9. The system described in claim 1 and a pressure relief safety valve in open communication with the pressure reservoir.

10. A closed system for simultaneously and continuously inerting and maintaining the vapor space or chamber within a fuel tank at a pressure substantially equivalent to external ambient atmospheric pressure regardless of changes in such atmospheric pressure, comprising: a pressure reservoir for storing inert gas and fuel vapor at a pressure greater than external ambient atmospheric pressure; a first passageway connecting the reservoir with the fuel tank vapor chamber; flow blocking means interposed in said passageway responsive to an increase in external ambient atmospheric pressure to open communication between the reservoir and the vapor chamber, and responsive to the resulting equalization of external ambient and internal vapor chamber pressures to again block communication between reservoir and vapor chamber; a second passageway connecting the reservoir with the vapor chamber; an electric motor driven pump interposed in the second passageway for drawing vapor from the vapor chamber and for delivering it into said reservoir; an electrical circuit for supplying power to the electric motor; a normally open relay actuated switch in said circuit; a branch circuit for supplying power to said relay; a normally open switch in the branch circuit; and means responsive to a decrease in external ambient atmospheric pressure for closing the last mentioned switch to actuate said relay and indirectly start the pump, and responsive to the resulting equalization of external ambient and internal vapor chamber pressures to open the last mentioned switch to open the relay circuit and stop said motor.

References Cited in the file of this patent

UNITED STATES PATENTS

| | | |
|---|---|---|
| 1,172,884 | Gungerich | Feb. 22, 1916 |
| 1,567,580 | Escholz | Dec. 29, 1925 |
| 1,689,352 | Maxon | Oct. 30, 1928 |
| 1,701,870 | Conrader | Feb. 12, 1929 |
| 2,049,987 | Willenborg | Aug. 4, 1936 |
| 2,640,627 | Doelter | June 2, 1953 |